(12) United States Patent
Yoshihira et al.

(10) Patent No.: US 9,988,007 B2
(45) Date of Patent: Jun. 5, 2018

(54) OCCLUSION CONTROL DEVICE

(71) Applicant: Nissan Motor Co., Ltd., Yokohama-shi, Kanagawa (JP)

(72) Inventors: Masanori Yoshihira, Kanagawa (JP); Seigo Watanabe, Kanagawa (JP); Norimasa Kishi, Kanagawa (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days. days.

(21) Appl. No.: 15/568,394

(22) PCT Filed: Apr. 23, 2015

(86) PCT No.: PCT/JP2015/062406
§ 371 (c)(1),
(2) Date: Oct. 20, 2017

(87) PCT Pub. No.: WO2016/170647
PCT Pub. Date: Oct. 27, 2016

(65) Prior Publication Data
US 2018/0118144 A1    May 3, 2018

(51) Int. Cl.
 B60R 21/00     (2006.01)
 B60R 21/0132  (2006.01)
 B60W 30/095   (2012.01)
 G06F 3/147    (2006.01)
 G08G 1/16     (2006.01)
 B60R 1/12     (2006.01)

(52) U.S. Cl.
  CPC ....... B60R 21/0132 (2013.01); B60W 30/095 (2013.01); G06F 3/147 (2013.01); G08G 1/167 (2013.01); B60R 2001/1253 (2013.01)

(58) Field of Classification Search
  CPC ...... H04N 5/23293; H04N 7/18; H04N 5/232; G06T 3/40; G02F 1/0121; G02F 1/01; B60R 2300/8026; B60R 2001/1253; B60R 1/06; G02B 27/01
  See application file for complete search history.

(56) References Cited

U.S. PATENT DOCUMENTS 5,059,796 A * 10/1991 Nakamura ........... G08B 13/194
                                                  250/330
6,011,901 A *  1/2000 Kirsten ............ G08B 13/19645
                                                348/E7.086

(Continued)

FOREIGN PATENT DOCUMENTS

EP    0353148 A2    1/1990
JP    H0235918 A    2/1990

(Continued)

*Primary Examiner* — Frank Huang
(74) *Attorney, Agent, or Firm* — Young Basile Hanlon & MacFarlane, P.C.

(57) ABSTRACT

An occlusion control device includes: a map obtaining unit that obtains map data with a close observation detecting criterion set in each of one or more close observation regions in which presence or absence of a moving object should be closely observed; a proportion calculator that calculates proportion of a blind spot for a host vehicle with respect to the close observation detecting criterion; and a behavior determining unit that selects coping behavior of the host vehicle based on the proportion.

9 Claims, 8 Drawing Sheets

(56) References Cited

U.S. PATENT DOCUMENTS

| | | | |
|---|---|---|---|
| 6,532,038 B1* | 3/2003 | Haring | B61L 23/041 340/541 |
| 8,068,986 B1* | 11/2011 | Shahbazi | H04L 63/126 342/28 |
| 8,947,218 B2 | 2/2015 | Yoshizawa et al. | |
| 2004/0030476 A1* | 2/2004 | Oswald | B60R 21/013 701/45 |
| 2007/0222566 A1* | 9/2007 | Tsuji | G06K 9/00369 340/435 |
| 2008/0055114 A1 | 3/2008 | Kim et al. | |
| 2009/0174573 A1* | 7/2009 | Smith | G08G 1/0962 340/905 |
| 2009/0216390 A1* | 8/2009 | Smith | H04L 67/12 701/2 |
| 2010/0208075 A1* | 8/2010 | Katsuno | B60Q 9/005 348/148 |
| 2010/0214086 A1* | 8/2010 | Yoshizawa | G01S 3/801 340/435 |
| 2011/0140919 A1* | 6/2011 | Hara | B60Q 1/50 340/907 |
| 2012/0218093 A1 | 8/2012 | Yoshizawa et al. | |
| 2012/0226394 A1* | 9/2012 | Marcus | A62B 5/00 701/2 |
| 2013/0057689 A1 | 3/2013 | Barth | |
| 2015/0211870 A1* | 7/2015 | Nickolaou | G01C 21/34 701/28 |

FOREIGN PATENT DOCUMENTS

| | | |
|---|---|---|
| JP | 2005165752 A | 6/2005 |
| JP | 2007336466 A | 12/2007 |
| JP | 2010000941 A | 1/2010 |
| JP | 2010165021 A | 7/2010 |
| JP | 2011096105 A | 5/2011 |
| JP | 2011248870 A | 12/2011 |
| JP | 2012038138 A | 2/2012 |
| JP | 2014074256 A | 4/2014 |
| KR | 20080004835 A | 1/2008 |

* cited by examiner

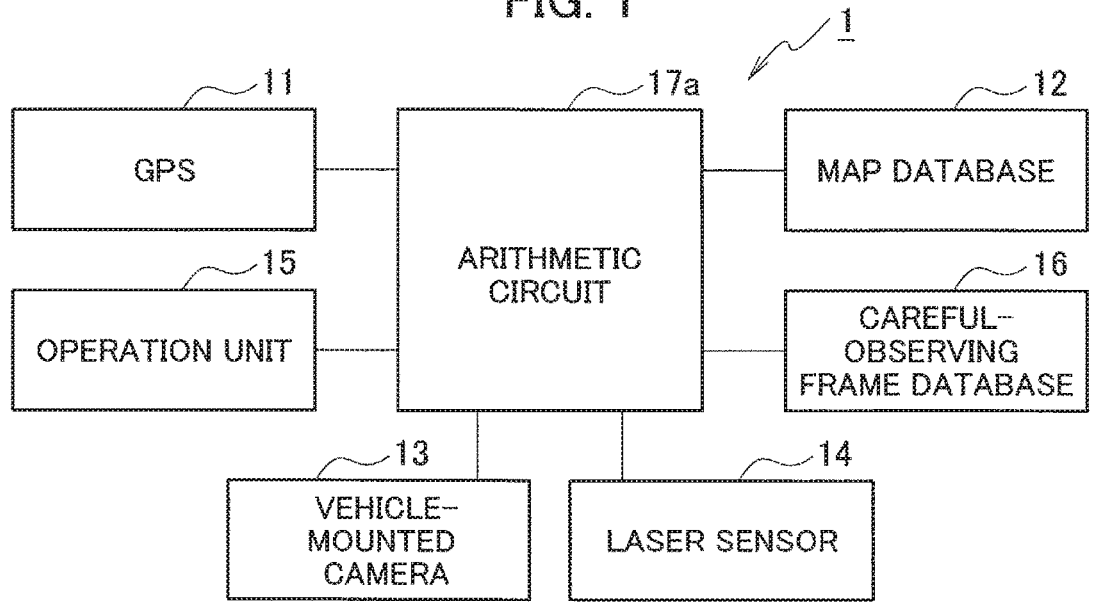
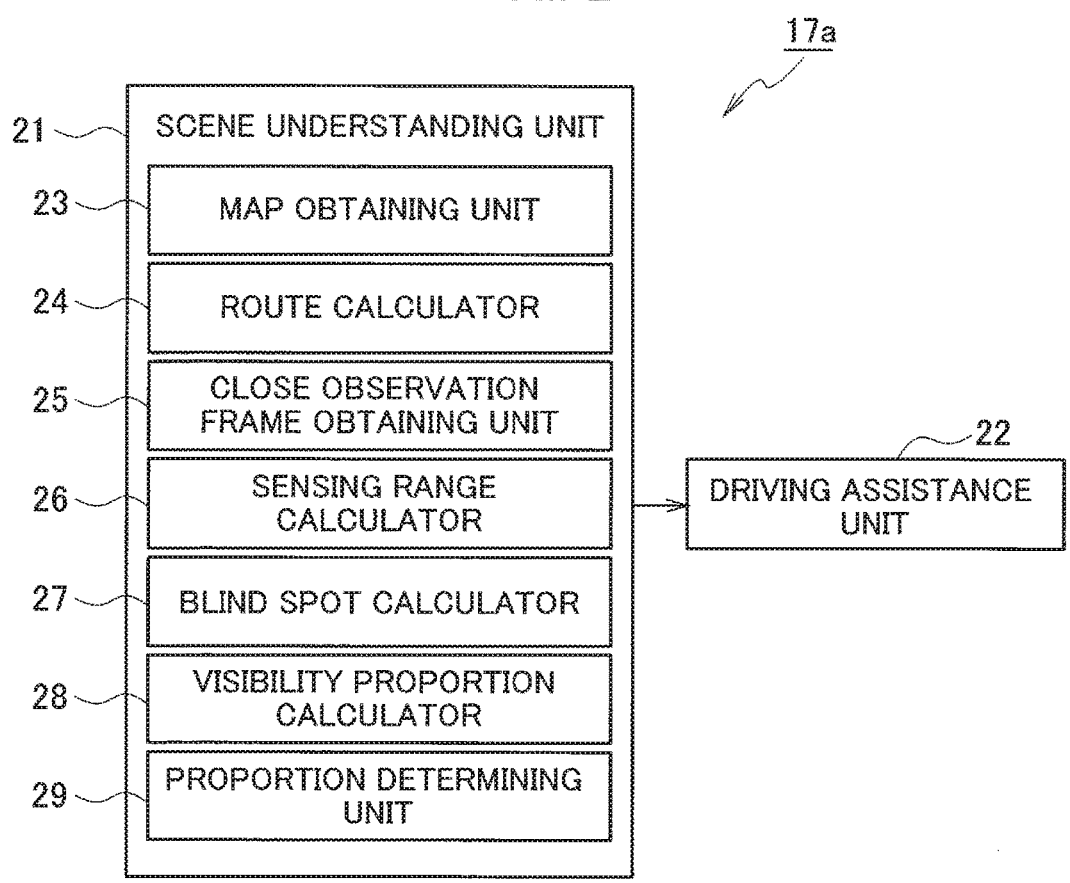

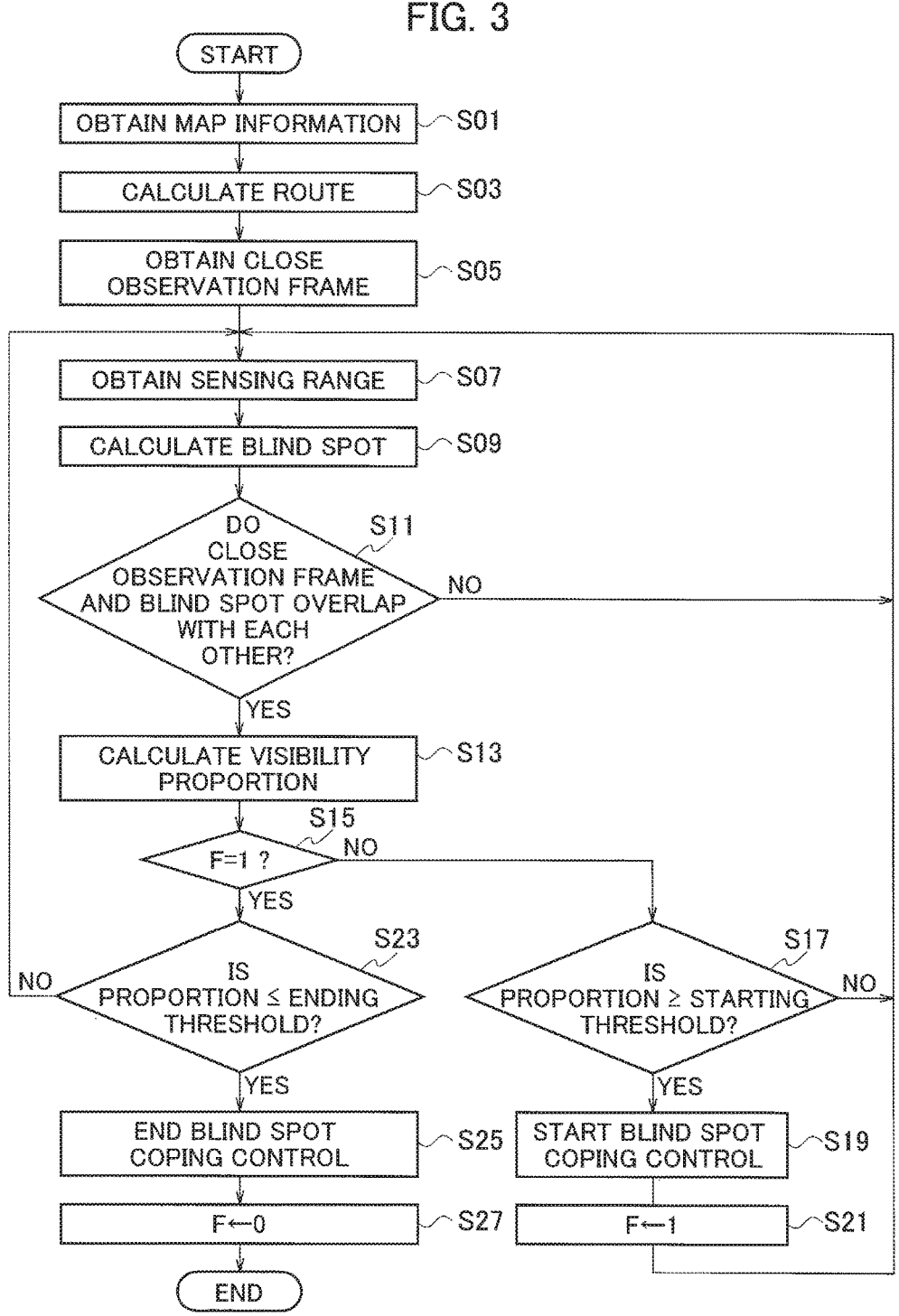

OCCLUSION CONTROL DEVICE

TECHNICAL FIELD

The present invention relates to an occlusion control device.

BACKGROUND

A driving assistance device has been known for predicting a risk of contact between a host vehicle and an obstacle around the host vehicle in a case where the host vehicle is traveling under driving behavior according to at least one or more normative behavior candidates, the normative behavior candidates being candidates for normative driving behavior of the host vehicle for a situation around the host vehicle (see Japanese Patent Application Publication No. 2011-096105).

Assuming that there is an obstacle moving toward the host vehicle with constant acceleration in a blind spot for the host vehicle, Japanese Patent Application Publication No. 2011-096105 calculates a potential contact risk and determines the driving behavior based on the contact risk.

In Japanese Patent Application Publication No. 2011-096105, however, proportion of the blind spot for the host vehicle with respect to a region on a map, which affects the contact risk, is not taken into account. Thus, driving behavior excessively focusing on safety may be determined, and this may make surrounding people uncomfortable.

SUMMARY

The present invention is made in light of the above problems. An object of the present invention is to provide an occlusion control device that suppresses driving behavior excessively reducing a risk of contact with a moving object.

An occlusion control device according to an aspect of the present invention calculates proportion of the blind spot for the host vehicle with respect to a close observation detecting criterion, which is set in one or more close observation region in which presence or absence of a moving object should be closely observed.

BRIEF DESCRIPTION OF THE DRAWINGS

FIG. 1 is a block diagram showing an overall configuration of an occlusion control device 1 according to a first embodiment;

FIG. 2 is a block diagram showing multiple processing circuits configured by an arithmetic circuit 17a;

FIG. 3 is a flowchart showing an example of an occlusion control method that uses the occlusion control device 1 shown in FIG. 1 and FIG. 2;

FIG. 4 shows an example where a close observation detecting criterion is a close observation frame 31 surrounding an outer periphery of a close observation region;

FIG. 11 is a plan view showing an example of close observation frames (31aa, 31ab) that are set in a case where a moving object (another vehicle 53) exists in a close observation region 31a;

FIG. 12 is a plan view showing an example of blind spot coping control for a scheduled traveling route 51 of the host vehicle 41;

DETAILED DESCRIPTION OF THE EMBODIMENTS

Figure 4A:
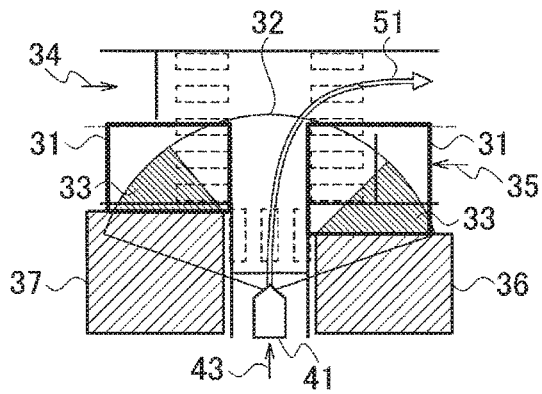
FIG. 4(a) is a plan view showing a position of a host vehicle 41 at time B shown in FIG. 4(b)

Next, referring to the drawings, embodiments of the present invention are described in detail.

First Embodiment

Figure 4B:
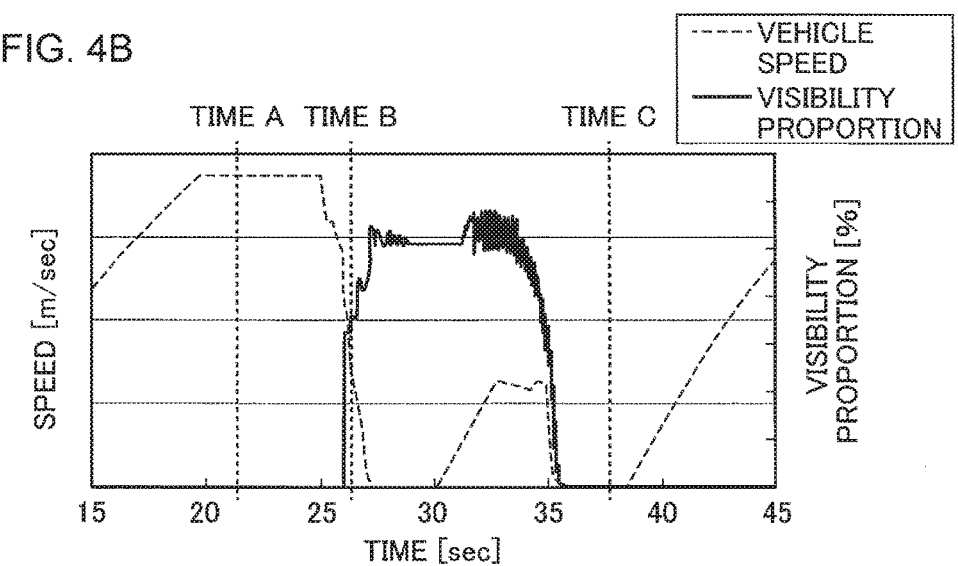
FIG. 4(b) is a graph showing a temporal change of speed of the host vehicle 41 and proportion calculated by a visibility proportion calculator 28.
Figure 5:
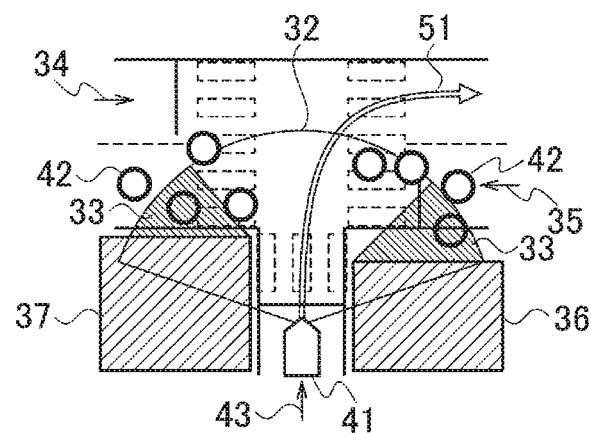
FIG. 5 is a plan view showing an example of a close observation point group including multiple close observation points.
Figure 6:
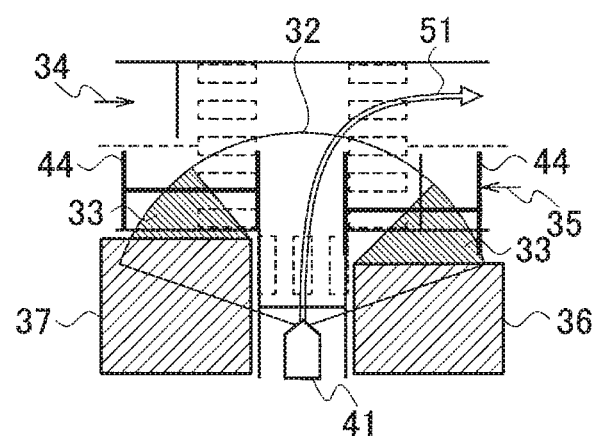
FIG. 6 is a plan view showing an example of a line bundle including one or more close observation line segments 44.
Figure 7:
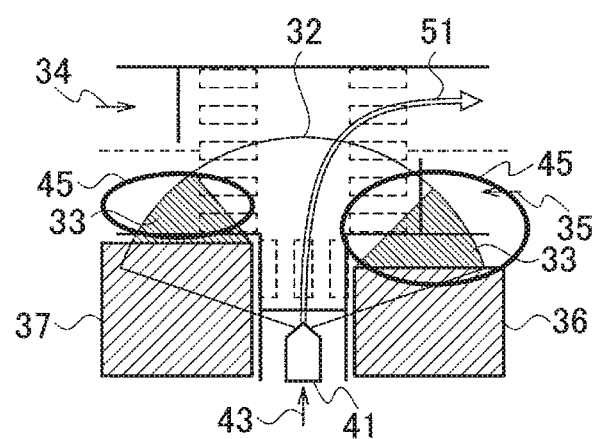
FIG. 7 is a plan view showing an example of the close observation frame 31 shaped in an oval 45.

Referring to FIG. 1 and FIG. 4, an overall configuration of an occlusion control device 1 according to a first embodiment is described. The occlusion control device 1 calculates proportion of a blind spot 33 for a host vehicle 41 with respect to a close observation detecting criterion (31) set on a map, determines coping behavior of the host vehicle 41 based on this proportion, and performs driving assistance for the host vehicle 41 according to this coping behavior. The close observation detecting criterion (31) is a criterion set in one or more close observation regions in which presence or absence of a moving object should be closely observed while the host vehicle 41 is traveling. The close observation detecting criterion (31) is illustrated with one or more frames (close observation frames 31; FIGS. 4, 7, 8), points (close observation points: FIG. 5), line segments (close observation line segments: FIG. 6), or a combination of the frame, the point, and the line segment. In addition to a blind spot for an occupant of the host vehicle 41, the blind spot 33 for the host vehicle 41 also includes a blind spot for a camera or a laser sensor mounted in the host vehicle. The coping behavior of the host vehicle 41 at least includes coping behavior that takes account of the blind spot 33 for the host vehicle 41 (blind spot coping behavior) and normal coping behavior that does not take account of the blind spot 33 for the host vehicle 41 (normal coping behavior).

As shown in FIG. 1, the occlusion control device 1 includes a GPS 11, a map database 12, a vehicle-mounted camera 13 and a laser sensor 14, an operating unit 15, a close observation frame database 16, and a arithmetic circuit 17a. The GPS 11 is an example of a host vehicle position detector that detects a current position and an orientation of the host vehicle. The GPS 11 receives an electric wave from a NAVSTAR satellite in a global positioning system and determines the position and the orientation of the host vehicle in real time. The host vehicle position detector may be a yaw rate sensor and a vehicle speed sensor for performing odometry (self position estimation) or may be used in combination with the GPS 11.

The map database 12 is an example of a map storage for storing map data showing shapes of roads on which the host vehicle can travel. The close observation frame database 16 stores data on a position and a size of the close observation frame 31 (see FIG. 4), which is an example of the close observation detecting criterion, on the map. This embodiment shows an example of storing the map data and the data on the close observation frame in different databases, respectively; however, it is not limited thereto. Map data in which the close observation frame is set in advance may be stored in one database. The close observation detecting criterion including the close observation frame is set in the one or more close observation regions on the map in which presence or absence of the moving object should be closely observed. The "moving object" includes a vehicle and a light vehicle that are traveling or standing on the road as well as a pedestrian.

The vehicle-mounted camera 13 and the laser sensor 14 are an example of an obstacle detector that detects positions of obstacles around the host vehicle. The vehicle-mounted camera 13 is mounted in the host vehicle and takes an image of surroundings of the host vehicle to obtain a surroundings image. The arithmetic circuit 17a analyzes the surroundings image to determine presence or absence and the position of the obstacle. In addition to buildings 36, 37 present around the host vehicle (see FIG. 4), a wall, a tree, a signboard that are fixed on the ground, the "obstacle" also includes the above-mentioned moving object. The laser sensor 14 emits pulses of laser light and detects light reflected from the obstacle, thereby detecting a distance and a direction from the host vehicle to the obstacle. The operating unit 15 includes a touch panel, a steering switch, and the like, which are members for receiving an instruction from the occupant of the host vehicle, arranged on a mike and an instrument panel.

The arithmetic circuit 17a uses information on the host vehicle position, the map, the obstacle, and the close observation frame to calculate proportion of the blind spot 33 for the host vehicle 41 with respect to the close observation frame 31. Then, the arithmetic circuit 17a determines the coping behavior of the host vehicle 41 based on this proportion and performs a series of computing processing for performing the driving assistance for the host vehicle 41. For example, the arithmetic circuit 17a is a general-purpose microcomputer including a CPU, a RAM, a ROM, a memory, and an input/output control circuit. A computer program in which the series of arithmetic processes is described is installed in the microcomputer in advance. Executing the computer program, the micro computer constructs multiple processing circuits for executing the above-mentioned series of arithmetic processes. The multiple processing circuits constructed by the arithmetic circuit 17a are described later by reference to FIG. 2.

Referring to FIG. 2 and FIG. 4, descriptions will be provided for the multiple processing circuits constructed by the arithmetic circuit 17a. As the multiple processing circuits, the arithmetic circuit 17a includes a scene understanding unit 21 and a driving assistance unit 22. The scene understanding unit 21 calculates proportion of the blind spot for the host vehicle and determines the coping behavior of the host vehicle based on this proportion.

According to the coping behavior of the host vehicle determined by the scene understanding unit 21, the driving assistance unit 22 performs the driving assistance for the host vehicle. Specifically, the driving assistance may be autonomous driving control that the driving assistance unit 22 drives various actuators so that the driving assistance unit 22 proactively performs all driving operation including steering operation and pedal operation. Alternatively, driving operation that the driver should perform may be indicated via the five senses such as hearing, eyesight, and touch of the driver.

The scene understanding unit 21 includes a map obtaining unit 23, a route calculator 24, a close observation frame obtaining unit 25, a sensing range calculator 26, a blind spot calculator 27, an visibility proportion calculator 28 (proportion calculator), and a proportion determining unit 29 (behavior determining unit).

The route calculator 24 calculates a scheduled traveling route 51 (see FIG. 4) from the current position of the host vehicle determined by the GPS 11 to a destination that the operating unit 15 receives. Note that, in the embodiments, a description for a case where the occlusion control device 1 has a function of computing the scheduled traveling route by itself is given. However, the occlusion control device 1 may obtain the scheduled traveling route 51 calculated by another device from outside.

The map obtaining unit 23 obtains the map data according to the scheduled traveling route 51 from the map database 12. A digital map can be used as the map data. The digital map includes curb information indicating a position of a curb or road network information. The curb information is used for calculating a travelable region of the host vehicle. The road network information is used for finding a region where the host vehicle 41 can travel at the later-mentioned time.

The close observation frame obtaining unit 25 obtains data on the position and the size of the close observation frame 31 on the map from the close observation frame database 16. The map obtaining unit 23 uses the obtained data on the close observation frame 31 to generate map data in which the close observation frame 31 is set. In this way, the map obtaining unit 23 can obtain the map data with the close observation frame 31 set in the one or more close observation region in which presence or absence of the moving object should be closely observed.

Based on the current position and orientation of the host vehicle as well as the map data, the sensing range calculator 26 calculates a sensing range 32 (see FIG. 4) on the map. The "sensing range 32" represents a range in which the vehicle-mounted camera 13 and the laser sensor 14 can detect the obstacle if there is no obstacle around the host vehicle 41. The sensing range 32 can be calculated for each of the vehicle-mounted camera 13 and the laser sensor 14 while the sensing range 32 is determined by the attached positions and angles of the vehicle-mounted camera 13 and the laser sensor 14 with respect to the host vehicle 41. Thus, the sensing range 32 on the map can be calculated based on the current position and orientation of the host vehicle 41 as well as the map data.

The blind spot calculator 27 calculates presence or absence of the blind spot 33 for the host vehicle 41 created by the obstacle and the range of the blind spot 33. Within the blind spots for the host vehicle 41 created by the obstacle (e.g., the buildings 36, 37), the blind spot calculator 27 detects a part that overlaps with the sensing range 32 as the blind spot 33 for the host vehicle.

The visibility proportion calculator 28 calculates proportion of the blind spot 33 for the host vehicle 41 with respect to the close observation frame 31 (the close observation detecting criterion). For example, with respect to the entire area of the close observation frame 31, the visibility proportion calculator 28 calculates proportion of the area of the close observation frame that overlaps with the blind spot 33 for the host vehicle.

Based on the proportion calculated by the visibility proportion calculator 28, the proportion determining unit 29 determines the coping behavior of the host vehicle 41. Specifically, based on the above-mentioned proportion, the proportion determining unit 29 selects either the blind spot coping behavior or the normal coping behavior.

Referring to FIG. 4, an example where the close observation detecting criterion is the close observation frames 31 surrounding the outer peripheries of the close observation regions is described. The FIGS. 4(a), 4(c), and 4(d) shows the host vehicle 41 traveling along the scheduled traveling route 51 that turns right at an intersection of a trifurcate road where three roads converge. Since the buildings 36 and 37 as the obstacle are standing on both sides of the host vehicle 41 entering into the intersection from a traveling direction 43, the blind spots 33 for the host vehicle 41 are created by the buildings 36 and 37. As described above, the blind spots 33 are calculated by the blind spot calculator 27. The close observation frame obtaining unit 25 obtains the close observation frames 31 in which presence or absence of the moving object should be closely observed for the scheduled traveling route 51 turning right at the intersection. With respect to the area of the close observation frame 31, the visibility proportion calculator 28 calculates proportion of each area of the close observation frames 31 that overlaps with the corresponding blind spot 33 for the host vehicle 41. As shown in FIG. 4(a), the close observation frames 31 are set in areas that tend to be the blind spots 33 for the host vehicle 41 because of the buildings 36 and 37.

Figure 4C:
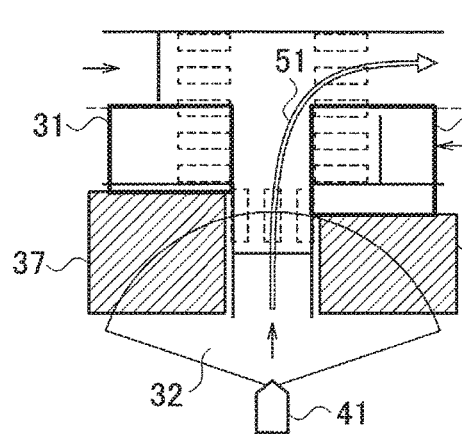
FIG. 4(c) shows a position of the host vehicle 41 at time A shown in FIG. 4(b)
Figure 4D:
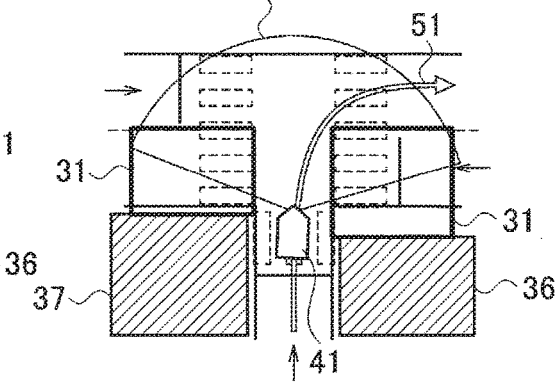
FIG. 4(d) shows a position of the host vehicle 41 at time C shown in FIG. 4(b)

At time A, as shown in FIG. 4(c), since the close observation frames 31 and the sensing range 32 do not overlap with each other, the visibility proportion calculator 28 performs no proportion calculating operation; thus, the proportion is 0%. The driving assistance unit 22 performs the normal coping behavior. As the close observation frames 31 and the sensing range 32 start to overlap with each other, the visibility proportion calculator 28 starts proportion calculating. Then, at time B, as shown in FIG. 4(a), proportion of each area of the close observation frames 31 overlapping with the blind spot 33 for the host vehicle 41 becomes greater than a predetermined value (e.g., 20%). With this, the proportion determining unit 29 selects the blind spot coping behavior as the coping behavior of the host vehicle 41. Further, at time C, as shown in FIG. 4(d), there is no blind spot created in the areas where the close observation frames 31 and the sensing range 32 overlap with each other. In other words, the vehicle is able to look the entirety of the close observation frames 31. Thus, with respect to the area of the close observation frames 31, proportion of each area of the close observation frames 31 overlapping with the blind spot 33 for the host vehicle 41 becomes 0%. The proportion determining unit 29 then selects the normal coping behavior as the coping behavior of the host vehicle 41. In this way, using the close observation frame 31 and the sensing range 32, the overlapping proportion of the blind spot of the host vehicle and the close observation frame 31 can be quantified as a degree of risk. This contributes to digitization of the risk of contact with the moving object.

At the time A, a vehicle speed of the host vehicle 41 is a speed based on the normal coping behavior. At the time B, as the coping behavior is switched to the blind spot coping behavior, the host vehicle 41 once decelerates to zero. Thereafter, the host vehicle 41 crawls until the visibility proportion decreases to smaller than or equal to the predetermined value and moves to a position where the host vehicle 41 is able to look the entirety of the close observation frames 31. Getting back to the normal coping behavior, the host vehicle 41 stops temporarily and then resumes the operation for turning right.

Referring to FIG. 3, an example of an occlusion control method according to the first embodiment is described. In the procedure of FIG. 3, once the occlusion control device is activated, the occlusion control method is performed repeatedly by a predetermined cycle and is ended with termination of the occlusion control device.

In step S01, the map obtaining unit 23 obtains the map data from the map database 12. The processing proceeds to step S03; based on the information on the position and the destination of the host vehicle 41, the route calculator 24 computes the scheduled traveling route 51 of the host vehicle. Note that the map data of an area according to the scheduled traveling route 51 may be obtained after the route computing. This makes it possible to reduce an amount of the obtained data.

In step S05, the close observation frame obtaining unit 25 obtains the data on the positions and the sizes of the close observation frames 31 on the map from the close observation frame database 16. The map obtaining unit 23 uses the obtained data on the close observation frames 31 to generate the map data in which the close observation frames 31 are set. The processing proceeds to step S07; the sensing range calculator 26 computes the sensing range 32 on the map based on the current position and orientation of the host vehicle as well as the map data.

The processing proceeds to step S09; within the blind spots for the host vehicle 41 created by the obstacle (e.g., the buildings 36, 37), the blind spot calculator 27 detects a part that overlaps with the sensing range 32 as the blind spot 33 for the host vehicle. Specifically, the blind spot calculator 27 obtains position information of the buildings 36, 37 present around the vehicle that is detected by the vehicle-mounted camera 13 and the laser sensor 14. By comparing the sensing range 32 and the positions of the buildings 36, 37, the blind spot calculator 27 can calculate the blind spots 33 for the host vehicle that overlap with the sensing range 32.

The processing proceeds to step S11; the scene understanding unit 21 determines whether the close observation frames 31 and the blind spots 33 of the host vehicle overlap with each other. If they overlap with each other (YES in S11), the processing proceeds to step S13. If they do not overlap with each other (NO in S11), the processing returns to step S07. In step S13, with respect to the entire area of the close observation frame 31, the visibility proportion calculator 28 calculates proportion of each area of the close observation frames that overlaps with the blind spot 33 for the host vehicle.

The processing proceeds to step S15; the proportion determining unit 29 determines whether the current coping behavior is the blind spot coping behavior or the normal coping behavior. Specifically, the proportion determining unit 29 determines whether a blind spot coping flag, which indicates that the coping behavior is the blind spot coping behavior, is on. If the blind spot coping flag is on (F=1)

(YES in S15), the processing proceeds to step S23 because the current coping behavior is the blind spot coping behavior. If no blind spot coping flag is on (F=0) (NO in S15), the processing proceeds to step S17 because the current coping behavior is the normal coping behavior.

Figure 9:
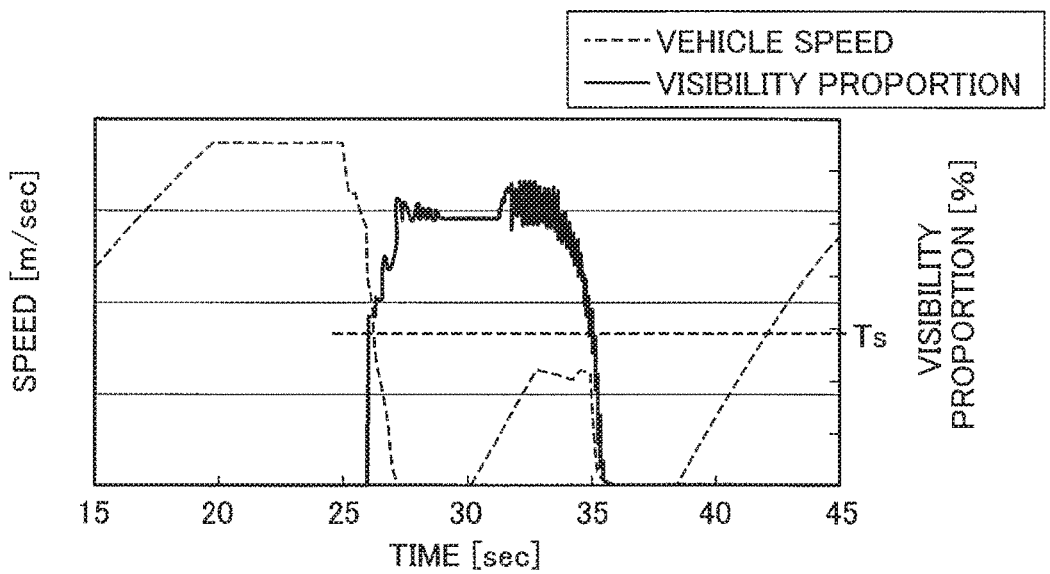
FIG. 9 is a graph showing an example of a starting threshold (Ts), which is a criterion for determining whether to start blind spot coping behavior.

In step S17, the proportion determining unit 29 determines whether the proportion calculated by the visibility proportion calculator 28 is greater than or equal to a predetermined starting threshold (Ts) as shown in FIG. 9. If the proportion is greater than or equal to the predetermined starting threshold (YES in S17), determination can be made that the risk of contact with the moving object is high. Thus, the processing proceeds to step S19; the proportion determining unit 29 decides to start the blind spot coping behavior, and the driving assistance unit 22 performs traveling control of the host vehicle according to the decided blind spot coping behavior. Thereafter, the processing proceeds to step S21; the blind spot coping flag is set to 1 (F=1). On the other hand, if the proportion is not greater than or equal to the predetermined starting threshold (NO in S17), determination can be made that the risk of contact with the moving object is still low. Thus, the normal coping behavior is continued, and the processing returns to step S07.

Figure 10:
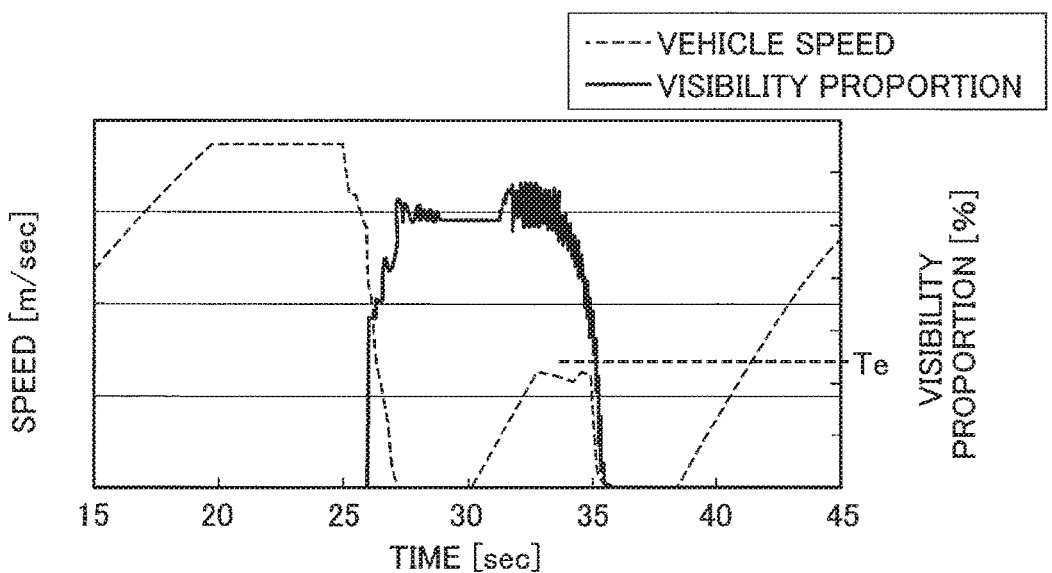
FIG. 10 is a graph showing an example of an ending threshold (Te), which is a criterion for determining whether to end the blind spot coping behavior.

In step S23, the proportion determining unit 29 determines whether the proportion calculated by the visibility proportion calculator 28 is smaller than or equal to a predetermined ending threshold (Te) as shown in FIG. 10. If the proportion is smaller than or equal to the predetermined ending threshold (Te) (YES in S23), determination can be made that the risk of contact with the moving object is low. Thus, the processing proceeds to step S25; the proportion determining unit 29 decides to end the blind spot coping behavior, and the driving assistance unit 22 performs traveling control of the host vehicle according to the normal coping behavior. The processing proceeds to step S27; the blind spot coping flag is set to 0 (F=0). On the other hand, if the proportion is not smaller than or equal to the predetermined ending threshold (Te) (NO in S23), determination can be made that the risk of contact with the moving object is still high. Thus, the blind spot coping behavior is continued, and the processing returns to step S07.

For example, at the time B in FIG. 4(b), since the proportion (visibility proportion) becomes greater than the predetermined starting threshold (Ts), the coping behavior switches from the normal coping behavior to the blind spot coping behavior (S19). This makes the vehicle speed decelerate from a usual speed to zero. Performing such blind spot coping behavior lowers the contact risk in a scene with bad visibility and allows safe traveling. Then, the blind spot coping behavior is continued until the proportion becomes smaller than the predetermined ending threshold (Te). Specifically, as shown in FIG. 10, the host vehicle is crawled and moved until the proportion becomes smaller than the predetermined ending threshold (Te). When the proportion becomes smaller than the predetermined ending threshold (Ts), the host vehicle is stopped. The starting threshold (Ts) and the ending threshold (Te) may be the same value; however, the ending threshold (Te) is desirably smaller than the starting threshold (Ts) so that hysteresis is made. This improves stability of a vehicle control system. For example, when the starting threshold (Ts) is set to 10%, the ending threshold (Te) may be set to 5%.

Note that, in a case where the moving object is detected in the region with good visibility while the vehicle is moving to make the proportion smaller than the predetermined ending threshold (Te), the vehicle is stopped. Otherwise, if moving speed of the moving object is slow, the vehicle may be accelerated to pass through in front of the moving object.

As described above, the following operation effect can be obtained according to this embodiment.

Determining the coping behavior of the host vehicle 41 based on the proportion of the blind spot 33 for the host vehicle 41 with respect to the close observation frame 31 (close observation detecting criterion) can suppress the driving behavior excessively focusing on safety. Thus, the driving behavior excessively focusing on safety can be suppressed, and discomfort that surrounding people feel can be lessened.

With respect to the entire area of the close observation frame 31 provided in the close observation region, the visibility proportion calculator 28 calculates proportion of the area of the close observation frame 31 that overlaps with the blind spot 33 of the host vehicle 41. Since the coping behavior is determined according to area ratio between the blind spot 33 and the frame surrounding the outer periphery of the close observation region, risk computing with high accuracy can be achieved with a simple model.

When the proportion becomes greater than the predetermined starting threshold (Ts), the proportion determining unit 29 decides to start the coping behavior that takes account of the blind spot 33 for the host vehicle 41. Switching the traveling control based on the starting threshold (Ts) as a boundary can achieve appropriate control for each scene. Performing the coping behavior excessively reducing the contact risk is suppressed.

Note that, as the speed of the host vehicle 41 is fast, it is desirable that the starting threshold (Ts) is set small. In this way, sudden speed control or steering control when starting control is suppressed, and thus the control can be started smoothly.

The driving assistance unit 22 allows the host vehicle to move until the proportion becomes smaller than the predetermined ending threshold (Te), and allows the host vehicle to stop thereafter. In this way, safe traveling can be performed even in a situation with bad visibility.

Second Embodiment

As shown in FIG. 5, the close observation detecting criterion may be a close observation point group including multiple close observation points 42 provided in the close observation region. In this case, with respect to the number of all close observation points 42 included in the close observation point group, the visibility proportion calculator 28 calculates proportion of the number of the close observation points 42 that overlap with the blind spots 33 for the host vehicle 41. Other configuration and operation procedure are the same as that in the first embodiment; thus, descriptions thereof are omitted. The close observation points 42 are arranged irregularly within the close observation region. In addition, density distribution of the close observation points 42 within the close observation region changes according to magnitude of the contact risk. That is, the close observation points 42 are distributed in high density at: a position where the moving object is likely to exist; a position with bad visibility; or a position where the risk of having the contact between the moving object and the host vehicle 41 is high if the moving object exists. This makes it possible to calculate appropriate proportion according to the contact risk.

In a case where the total number of the close observation points provided in one close observation region is determined in advance, the visibility proportion calculator 28 just simply obtains the number of the close observation points 42 that overlap with the blind spot 33 for the host vehicle 41. In this case, also the starting threshold (Ts) and the ending threshold (Te) can be determined based on the number of the close observation points 42.

In a case where one close observation point 42 has a predetermined size, and part of the close observation point 42 overlaps with the blind spot 33, the proportion may be calculated like the first embodiment by using the area ratio between the overlapping part and the close observation frame surrounding an outer periphery of the close observation point 42. That is, as far as computing processing load allows, each close observation point 42 can be used as one or more close observation frame 31 in FIG. 4.

In this way, the proportion can be simply obtained from the number of the close observation points by setting the close observation point group including the multiple close observation points 42 provided in the close observation region as the close observation detecting criterion. Thus, risk computing with high accuracy can be achieved without increasing calculation load.

Third Embodiment

As shown in FIG. 6, the close observation detecting criterion may be a line bundle including one or more close observation line segments 44 provided in the close observation region. In this case, with respect to the total value of lengths of all close observation line segments 44 provided in the close observation region, the visibility proportion calculator 28 calculates proportion of the lengths of the close observation line segments 44 that overlap with the blind spot 33 for the host vehicle 41. Other configuration and operation procedure are the same as that in the first embodiment; thus, descriptions thereof are omitted.

The lengths, the number, and arrangement of the close observation line segments 44 can be changed arbitrarily. According to the magnitude of the contact risk, density distribution of the close observation line segments 44 within the close observation region is changed. That is, the close observation line segments 44 are distributed in high density at: a position where the moving object is likely to exist; a position with bad visibility; or a position where the risk of having the contact between the moving object and the host vehicle 41 is high if the moving object exists. This makes it possible to calculate appropriate proportion according to the contact risk.

In the example shown in FIG. 6, in two close observation regions, four line segments perpendicular to a traveling direction 35 of the vehicle and two line segments parallel to the traveling direction 35 of the vehicle are illustrated. All line segments are straight, but all of or one of the line segments may be curved, of course.

In a case where the total length of each close observation line segment 44 provided in one close observation region is determined in advance, the visibility proportion calculator 28 may just simply obtain the length of the close observation line segment 44 that overlap with the blind spot 33 for the host vehicle 41. In this case, also the starting threshold (Ts) and the ending threshold (Te) can be determined based on the length of the close observation line segment 44.

In this way, the proportion can be simply obtained from the length of the close observation line segment 44 by setting the one or more close observation line segments 44 provided in the close observation region as the close observation detecting criterion. Thus, risk computing with high accuracy can be achieved without increasing calculation load.

Note that the close observation frame 31 shown in FIG. 4 can be interpreted as a line bundle including four close observation line segments 44 provided in the close observation region. In a case where the four close observation line segments 44 form one close observation frame 31, the visibility proportion calculator 28 may just calculate proportion of the length of the close observation frame 31 that overlaps with the blind spot 33 for the host vehicle 41 with respect to the total length of the close observation frame 31.

In addition, in a case other than the case where the close observation frame 31 includes line segments surrounding the outer periphery of the close observation region, the whole close observation frame 31 may be one line segment including one curved line as shown in FIG. 7. In other words, the close observation frame 31 is not limited to be a quadrangle as shown in FIG. 4; for example, the close observation frame 31 may be an oval 45, a true circle, a triangle, or a polygon with five or more corners. Moreover, in a case where three or more close observation line segments 44 form a closed frame, proportion of the blind spot that overlaps with the area surrounded by the frame may be calculated like the first embodiment.

Fourth Embodiment

The close observation detecting criterion may include weighting that is changed according to a position on the map. In this case, proportion of the blind spot for the host vehicle with respect to the close observation detecting criterion changes according to the weighting applied to the position on the map where the close observation detecting criterion overlaps with the blind spot for the host vehicle. For example, in a case where the close observation detecting criterion is the close observation frame, proportion of the area where the close observation frame and the blind spot for the host vehicle overlap with each other with respect to the entire area of the close observation frame changes according to the weighting.

Figure 8A:
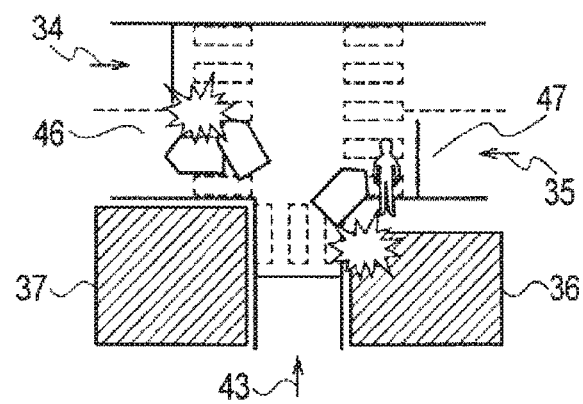
FIG. 8(a) is a plan view showing an example of past accident data (46, 47)
Figure 8B:
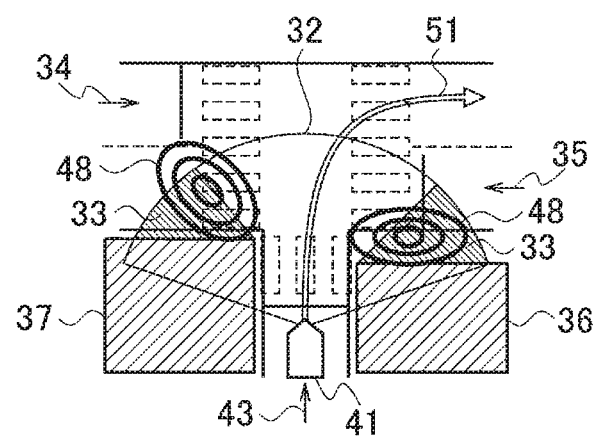
FIG. 8(b) is a plan view showing an example of a close observation frame 48 to which weighting is applied.
Figure 8C:
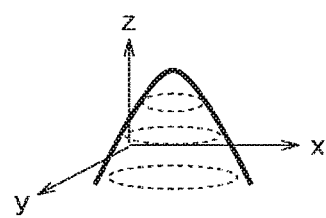
FIG. 8(c) is a graph showing gauss distribution of accident probability Z as an example of the weighting.

FIG. 8 shows an example of a close observation frame 48 to which weighting is applied. As shown in FIG. 8(b), the close observation frame 48 includes overlapped multiple (three in FIG. 8) ovals with different sizes. As shown in FIG. 8(c), each oval is applied with information on accident probability Z as an example of the weighting. Specifically, an inner small oval is applied with information indicating the accident probability Z that is possibility higher than that associated with an outer larger oval. Thus, the contact risk is higher in a case where the blind spot 33 for the host vehicle 41 overlaps with the inner smaller oval than in a case where the blind spot 33 for the host vehicle 41 overlaps with the outer larger oval, and the proportion (visibility proportion) becomes greater.

Note that the information for the accident probability Z may be obtained by downloading past accident data (46, 47) from an accident information management server as shown in FIG. 8(a), for example. In addition, a position on the map to which high accident probability Z is applied may be not only a position where an accident is occurred in the past, but may also be another position that is similar to the position where an accident is occurred. For example, if there was an accident of hitting another vehicle when turning right or left at an intersection, the high accident probability Z can also be applied to a position where similar accident can be occurred in a case of entering into different intersection or the same intersection from another direction.

A value of the accident probability Z may be changed according to a detail of the accident. For example, the accident probability Z of a fatal accident may be higher than that of a property damage accident. Distribution of the accident probability Z shown in FIG. 8(c) can be calculated as gauss distribution, for example.

In this way, proportion of the blind spot 33 for the host vehicle 41 with respect to the close observation detecting criterion is changed according to the weighting (the accident probability Z) applied to the position on the map that overlaps with the blind spot 33 for the host vehicle 41. This makes it possible to accurately evaluate the contact risk, and to calculate appropriate proportion according to the contact risk.

n the fourth embodiment, the case where the close observation detecting criterion is made of the oval frame has been described as an example. Other than this, it goes without saying that the close observation line segment and the close observation point can also be weighted in the same way.

Fifth Embodiment

The close observation detecting criterion may be changed according to a date and time, an environment around the host vehicle 41, or a way of motion of the moving object present around the host vehicle 41.

An example where the close observation detecting criterion is changed according to the date and time is described below. In a case where a traffic signal changes to a blinking signal over time at an intersection, the close observation detecting criterion is set. If the traffic signal operates normally, no close observation detecting criterion is set. At a specific spot where a traffic amount is increased according to the date and time such as a holiday, the close observation detecting criterion is set widely. Alternatively, on the date and time when the traffic amount is increased, the starting threshold and the ending threshold of the blind spot coping control are decreased. This lowers the contact risk and improves safety.

An example where the close observation detecting criterion is changed according to the environment around the host vehicle 41 is described below. In bad weather, a storm, or at night time, it is difficult for an occupant of another vehicle to confirm safety around the vehicle. Under such a situation, it is difficult for the host vehicle to be recognized, and thus the host vehicle needs to lower the contact risk and to further improve safety. For this reason, the close observation detecting point is made wider than usual. Otherwise the starting threshold and the ending threshold of the blind spot coping control are decreased. This makes it possible to lower the contact risk and to improve safety.

Figure 11:
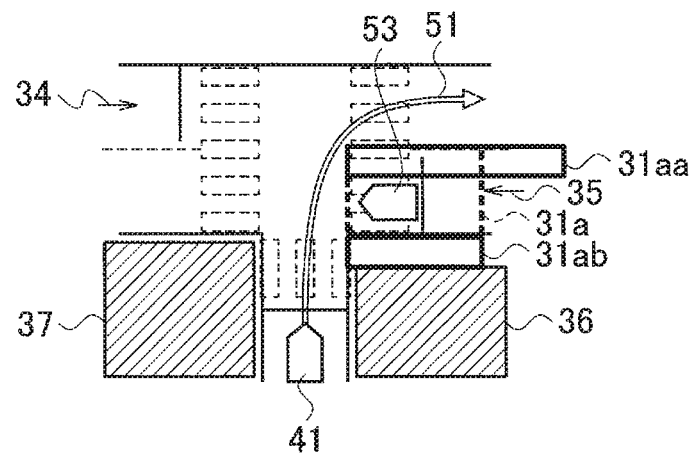

An example where the close observation detecting criterion is changed according to the way of motion of the moving object present around the host vehicle 41 is described below. As shown in FIG. 11, in a case where a moving object (another vehicle 53) is in a close observation region 31a, while the other vehicle 53 is in between, a side closer to the host vehicle 41 and a side farther from the host vehicle 41 may be respectively applied with divided close observation frames (31aa, 31ab). In this case, the close observation frame 31ab in the closer side is set for detecting a pedestrian, while the close observation frame 31aa in the farther side is set for detecting a two-wheel vehicle.

Different close observation detecting criteria can be set for a case where the other vehicle 53 is standing at a stop line on an entry of the intersection and for a case where the other vehicle 53 is traveling around the stop line. In a case where the close observation detecting criterion is the close observation frame, a close observation frame with a short length in a traveling direction of the other vehicle 53 is set as the speed of the other vehicle 53 is higher, and in a case where the other device 53 is standing at the stop line, a close observation frame with a long length in the traveling direction of the other vehicle 53 is set. The reason why the length of the close observation frame made long when the other vehicle 53 is standing is that long-distance vision is needed for predicting the two-wheel vehicle coming into the close observation region. Alternatively, in a case where the other vehicle 53 is standing at the stop line, the starting threshold and the ending threshold of the blind spot coping control are decreased. This makes it possible to lower the contact risk and to improve safety.

As described above, changing the close observation detecting criterion according to the date and time, the environment around the host vehicle 41, and the way of motion of the moving object present around the host vehicle 41 makes it possible to accurately evaluate the contact risk and to calculate appropriate proportion according to the contact risk. Safety can be improved under a situation such as a situation where the road is crowded on holiday or during commuting time, at sunset time, or at night time, where it is difficult for the other vehicle to confirm safety around the vehicle.

Although the embodiments of the present invention have been described above, the descriptions or drawings constituting part of this disclosure should not be understood as limiting the present invention. From the disclosure, various alternative embodiments, examples and operation techniques will be apparent to those skilled in the art.

Figure 12A:
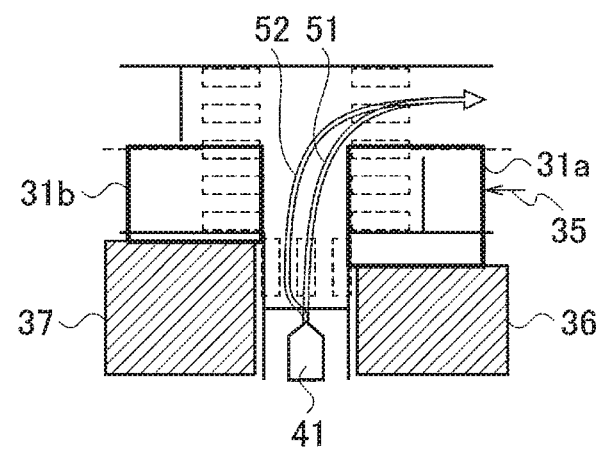
FIG. 12(a) shows the blind spot coping control for turning right at an intersection.

For example, in the embodiments, the blind spot coping control for the speed of the host vehicle 41 has been described as shown in FIG. 4(b); however, the blind spot coping control is not only for the speed of the host vehicle 41 but also for the scheduled traveling route 51 of the host vehicle 41. For example, as shown in FIG. 12(a), in the embodiments, the host vehicle 41 turns right at the intersection along the scheduled traveling route 51. In this respect, the host vehicle 41 is started to move toward the left side before entering into the intersection and turns right at the intersection along a scheduled traveling route 52 that is on the outer side of the scheduled traveling route 51. In this way, the blind spot that overlaps with the close observation region 31a can be decreased when entering into the intersection. This makes it possible to allow the host vehicle 41 to pass through the intersection safely without excessive deceleration control.

Figure 12B:
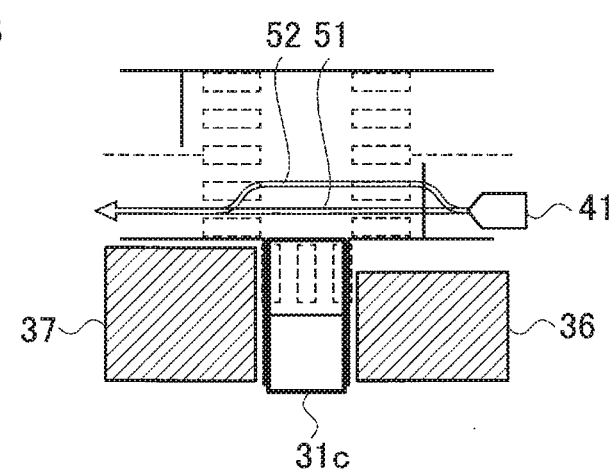
FIG. 12(b) shows the blind spot coping control for going straight through the intersection.

Even if the direction entering into the intersection is changed, the blind spot coping control for the scheduled traveling route of the host vehicle 41 can be performed. For example, as shown in FIG. 12(b), in a case where the host vehicle 41 goes straight through the intersection of trifurcate road same as the intersection in FIG. 12(a), a close observation region 31c exists on the left side of the host vehicle 41. The host vehicle 41 is started to move toward the right side before entering into the intersection and goes straight through the intersection along the scheduled traveling route 52 that is on the right side of the scheduled traveling route 51. In this way, the blind spot that overlaps with the close observation region 31c can be decreased when entering into the intersection.

Assuming that there is an obstacle moving toward the host vehicle with constant acceleration in a blind spot for the host vehicle, Patent Literature 1 calculates a potential contact risk and determines the driving behavior based on the contact risk. However, even if there is a motionless object within the route of the host vehicle, Patent Literature 1 cannot take account of the static condition and thus determines that the host vehicle will collide with the motionless object. Even in a case where the host vehicle can prevent itself from having a contact with the moving object by acceleration, the host vehicle cannot accelerate. Even if there is no obstacle on the back side of the blind spot, the host vehicle does not expect that there is no moving object. Thus, the host vehicle decelerates even in a case where no deceleration is needed. The embodiments take account of proportion of the blind spot for the host vehicle with respect to the close observation region on the map, which affects the contact risk. Thus, the driving behavior excessively focusing on safety can be suppressed, and discomfort that surrounding people feel can be lessened.

REFERENCE SIGNS LIST 1 occlusion control device
22 driving assistance unit (vehicle control unit)
23 map obtaining unit
28 visibility proportion calculator
29 proportion determining unit (behavior deciding unit)
31, 48 close observation frame (close observation detecting criterion)
33 blind spot
41, 46 host vehicle
42 close observation point (close observation detecting criterion)
44 close observation line segment (close observation detecting criterion)
51, 52 scheduled traveling route

The invention claimed is:

1. An occlusion control device comprising:
a map obtaining circuit that obtains map data in which one or more close observation detecting criterion set in advance and in which presence or absence of a moving object should be closely observed;
a proportion calculator that calculates proportion of a blind spot for a host vehicle with respect to the close observation detecting criterion;
a behavior determining circuit that determines coping behavior of the host vehicle based on the proportion; and
a vehicle controller that performs traveling control of the host vehicle according to the determined coping behavior, wherein
the vehicle controller controls a speed of the host vehicle based on the proportion.

2. The occlusion control device according to claim 1, wherein
the close observation detecting criterion is a close observation point group including a plurality of close observation points, and
the proportion calculator calculates proportion of the number of the close observation points that overlap with the blind spot for the host vehicle with respect to the number of all the close observation points included in each close observation point group.

3. The occlusion control device according to claim 1, wherein
the close observation detecting criterion includes one or more close observation line segments, and
the proportion calculator calculates proportion of lengths of the close observation line segments that overlap with the blind spot for the host vehicle with respect to the total value of the lengths of all the close observation line segments.

4. The occlusion control device according to claim 1, wherein
the close observation detecting criterion includes one or more close observation frames, and
the proportion calculator calculates proportion of areas of the close observation frames that overlap with the blind spot for the host vehicle with respect to the areas of all the close observation frames.

5. The occlusion control device according to claim 1, wherein
the close observation detecting criterion includes weighting that changes according to a position on a map, and
proportion of the blind spot for the host vehicle with respect to the close observation detecting criterion is changed according to the weighting applied to a position on the map that overlaps with the blind spot for the host vehicle.

6. The occlusion control device according to claim 1, wherein
when the proportion becomes greater than a predetermined starting threshold, the behavior determining circuit decides to start coping behavior that takes account of the blind spot for the host vehicle.

7. The occlusion control device according to claim 6, wherein the starting threshold is set smaller as a speed of the host vehicle is higher.

8. The occlusion control device according to claim 6 or 7, wherein
the behavior determining circuit determines whether the proportion becomes smaller than a predetermined ending threshold, and
the vehicle controller allows the host vehicle to move until the proportion becomes smaller than the predetermined ending threshold, and thereafter allows the host vehicle to stop.

9. The occlusion control device according to claim 1, wherein
the close observation detecting criterion is changed according to a date and time, an environment around the host vehicle, or a way of motion of a moving object present around the host vehicle.

* * * * *